US011362967B2

(12) United States Patent
Bosshart et al.

(10) Patent No.: US 11,362,967 B2
(45) Date of Patent: Jun. 14, 2022

(54) EXPANSION OF PACKET DATA WITHIN PROCESSING PIPELINE

(71) Applicant: Barefoot Networks, Inc., Santa Clara, CA (US)

(72) Inventors: Patrick Bosshart, Plano, TX (US); Jay Evan Scott Peterson, San Francisco, CA (US); Michael Gregory Ferrara, Palo Alto, CA (US); Michael E. Attig, Sunnyvale, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 16/789,339

(22) Filed: Feb. 12, 2020

(65) Prior Publication Data
US 2020/0259765 A1    Aug. 13, 2020

Related U.S. Application Data

(63) Continuation of application No. 15/835,233, filed on Dec. 7, 2017, now Pat. No. 10,594,630.
(Continued)

(51) Int. Cl.
*H04L 12/935*    (2013.01)
*H04L 49/00*     (2022.01)
(Continued)

(52) U.S. Cl.
CPC ........ *H04L 49/3063* (2013.01); *H04L 45/745* (2013.01); *H04L 45/7453* (2013.01);
(Continued)

(58) Field of Classification Search
CPC ... H04L 43/02; H04L 45/745; H04L 45/7453; H04L 45/7457; H04L 45/748;
(Continued)

(56) References Cited

U.S. PATENT DOCUMENTS 5,243,596 A    9/1993  Port et al.
5,642,483 A    6/1997  Topper
(Continued)

FOREIGN PATENT DOCUMENTS

CN       1589551     3/2005
CN     101352012     1/2009
(Continued)

OTHER PUBLICATIONS

Bosshart, Patrick, et al., "Forwarding Metamorphosis: Fast Programmable Match-Action Processing in Hardware or SON," SIGCOMM'13, Aug. 12-16, 2013, 12 pages, ACM, Hong Kong, China.
(Continued)

*Primary Examiner* — Thomas R Cairns
(74) *Attorney, Agent, or Firm* — Essential Patents Group, LLP.; Christopher K. Gagne

(57) ABSTRACT

Some embodiments provide a network forwarding IC with packet processing pipelines, at least one of which includes a parser, a set of match-action stages, and a deparser. The parser is configured to receive a packet and generate a PHV including a first number of data containers storing data for the packet. A first match-action stage is configured to receive the PHV from the parser and expand the PHV to a second, larger number of data containers storing data for the packet. Each of a set of intermediate match-action stage is configured to receive the expanded PHV from a previous stage and provide the expanded PHV to a subsequent stage. A final match-action stage is configured to receive the expanded PHV and reduce the PHV to the first number of data containers. The deparser is configured to receive the reduced PHV from the final match-action stage and reconstruct the packet.

21 Claims, 9 Drawing Sheets

Related U.S. Application Data

(60) Provisional application No. 62/564,659, filed on Sep. 28, 2017.

(51) Int. Cl.
| | |
|---|---|
| *H04L 45/745* | (2022.01) |
| *H04L 47/2441* | (2022.01) |
| *H04L 49/109* | (2022.01) |
| *H04L 69/22* | (2022.01) |
| *H04L 45/7453* | (2022.01) |

(52) U.S. Cl.
CPC ........ *H04L 47/2441* (2013.01); *H04L 49/109* (2013.01); *H04L 69/22* (2013.01)

(58) Field of Classification Search
CPC . H04L 47/2441; H04L 47/2483; H04L 49/10; H04L 49/109; H04L 49/3063; H04L 49/9042; H04L 69/04; H04L 69/22; H94W 28/06

See application file for complete search history.

(56) References Cited

U.S. PATENT DOCUMENTS

| | | | |
|---|---|---|---|
| 5,784,003 | A | 7/1998 | Dahlgren |
| 6,157,955 | A | 12/2000 | Narad et al. |
| 6,442,172 | B1 | 8/2002 | Wallner et al. |
| 6,453,360 | B1 | 9/2002 | Muller et al. |
| 6,735,679 | B1 | 5/2004 | Herbst et al. |
| 6,836,483 | B1 | 12/2004 | Lee |
| 6,948,099 | B1 | 9/2005 | Tallam |
| 6,976,149 | B1 | 12/2005 | Brandt et al. |
| 6,980,552 | B1 | 12/2005 | Belz et al. |
| 7,046,685 | B1 | 5/2006 | Matsuoka et al. |
| 7,177,276 | B1 | 2/2007 | Epps et al. |
| 7,203,740 | B1 | 4/2007 | Putzolu et al. |
| 7,389,462 | B1 | 6/2008 | Wang et al. |
| 7,492,714 | B1 | 2/2009 | Liao et al. |
| 7,499,941 | B2 | 3/2009 | Michaeli et al. |
| 7,539,777 | B1 | 5/2009 | Aitken |
| 7,643,486 | B2 | 1/2010 | Belz et al. |
| 7,826,470 | B1 | 11/2010 | Aloni et al. |
| 7,872,774 | B2 | 1/2011 | Okamoto |
| 7,873,959 | B2 | 1/2011 | Zhu et al. |
| 7,889,750 | B1 | 2/2011 | Parker |
| 7,961,734 | B2 | 6/2011 | Panwar et al. |
| 8,077,611 | B2 | 12/2011 | Bettink et al. |
| 8,155,135 | B2 | 4/2012 | Aloni et al. |
| 8,514,855 | B1 | 8/2013 | Robertson et al. |
| 8,527,613 | B2 | 9/2013 | Malone et al. |
| 8,638,793 | B1 | 1/2014 | Ben-Mayor et al. |
| 8,693,374 | B1 | 4/2014 | Murphy et al. |
| 8,738,860 | B1 | 5/2014 | Griffin et al. |
| 8,788,512 | B2 | 7/2014 | Asaad et al. |
| 8,971,338 | B2 | 3/2015 | Mishra et al. |
| 9,049,153 | B2 | 6/2015 | Casado et al. |
| 9,049,271 | B1 | 6/2015 | Hobbs et al. |
| 9,055,004 | B2 | 6/2015 | Edsall et al. |
| 9,055,114 | B1 | 6/2015 | Talaski et al. |
| 9,112,818 | B1 | 8/2015 | Arad et al. |
| 9,124,644 | B2 | 9/2015 | Patel et al. |
| 9,213,537 | B2 | 12/2015 | Bandakka et al. |
| 9,258,224 | B2 | 2/2016 | Bosshart et al. |
| 9,276,846 | B2 | 3/2016 | Goyal et al. |
| 9,294,386 | B2 | 3/2016 | Narad |
| 9,298,446 | B2 | 3/2016 | Chang et al. |
| 9,450,817 | B1 | 9/2016 | Bahadur et al. |
| 9,467,363 | B2 | 10/2016 | Gao |
| 9,686,209 | B1 | 6/2017 | Arad et al. |
| 9,712,439 | B2 | 7/2017 | Bosshart et al. |
| 9,755,932 | B1 | 9/2017 | Godbole et al. |
| 9,825,862 | B2 | 11/2017 | Bosshart |
| 9,826,071 | B2 | 11/2017 | Bosshart |
| 9,838,268 | B1 | 12/2017 | Mattson |
| 9,891,898 | B1 | 2/2018 | Tonsing |
| 9,912,610 | B2 | 3/2018 | Bosshart et al. |
| 9,912,774 | B2 | 3/2018 | Daly et al. |
| 9,923,816 | B2 | 3/2018 | Kim et al. |
| 10,009,276 | B2 | 6/2018 | Bosshart et al. |
| 10,015,048 | B2 | 7/2018 | Gasparakis et al. |
| 10,044,646 | B1 | 8/2018 | Detwiler |
| 10,091,137 | B2 | 10/2018 | Tran et al. |
| 10,135,734 | B1 | 11/2018 | Singh et al. |
| 10,225,381 | B1 | 3/2019 | Bosshart |
| 10,341,242 | B2 | 7/2019 | Srinivasan et al. |
| 10,361,914 | B2 | 7/2019 | Gasparakis et al. |
| 10,412,018 | B1 | 9/2019 | Feng et al. |
| 10,419,242 | B1 | 9/2019 | Tonsing et al. |
| 10,419,366 | B1 | 9/2019 | Kim et al. |
| 10,432,527 | B1 | 10/2019 | Bosshart |
| 10,505,861 | B1 | 12/2019 | Li et al. |
| 10,523,578 | B1 | 12/2019 | Li et al. |
| 10,601,732 | B1 | 3/2020 | Peterson et al. |
| 10,686,735 | B1 | 6/2020 | Watson |
| 2001/0043611 | A1 | 11/2001 | Kadambi et al. |
| 2002/0001356 | A1 | 1/2002 | Shenoi |
| 2002/0136163 | A1 | 9/2002 | Kawakami et al. |
| 2002/0172210 | A1 | 11/2002 | Wolrich et al. |
| 2003/0009466 | A1 | 1/2003 | Ta et al. |
| 2003/0043825 | A1 | 3/2003 | Magnussen et al. |
| 2003/0046414 | A1 | 3/2003 | Pettyjohn et al. |
| 2003/0046429 | A1 | 3/2003 | Sonksen |
| 2003/0063345 | A1 | 4/2003 | Fossum et al. |
| 2003/0107996 | A1 | 6/2003 | Black et al. |
| 2003/0118022 | A1 | 6/2003 | Kulkarni et al. |
| 2003/0147401 | A1 | 8/2003 | Kyronaho et al. |
| 2003/0154358 | A1 | 8/2003 | Seong et al. |
| 2003/0167373 | A1 | 9/2003 | Winters et al. |
| 2003/0219026 | A1 | 11/2003 | Sun et al. |
| 2004/0024894 | A1 | 2/2004 | Osman et al. |
| 2004/0031029 | A1 | 2/2004 | Lee et al. |
| 2004/0042477 | A1 | 3/2004 | Bitar et al. |
| 2004/0105384 | A1 | 6/2004 | Gallezot et al. |
| 2004/0123220 | A1 | 6/2004 | Johnson et al. |
| 2004/0165588 | A1 | 8/2004 | Pandya |
| 2004/0213156 | A1 | 10/2004 | Smallwood et al. |
| 2005/0013251 | A1 | 1/2005 | Wang et al. |
| 2005/0041590 | A1 | 2/2005 | Olakangil et al. |
| 2005/0060428 | A1 | 3/2005 | Corl et al. |
| 2005/0078651 | A1 | 4/2005 | Lee et al. |
| 2005/0086353 | A1 | 4/2005 | Shirakawa et al. |
| 2005/0108518 | A1 | 5/2005 | Pandya |
| 2005/0120173 | A1 | 6/2005 | Minowa |
| 2005/0129059 | A1 | 6/2005 | Jiang et al. |
| 2005/0149823 | A1 | 7/2005 | Lee |
| 2005/0198531 | A1 | 9/2005 | Kaniz et al. |
| 2005/0243852 | A1 | 11/2005 | Bitar et al. |
| 2006/0002386 | A1 | 1/2006 | Yik et al. |
| 2006/0039374 | A1 | 2/2006 | Belz et al. |
| 2006/0050690 | A1 | 3/2006 | Epps et al. |
| 2006/0072480 | A1 | 4/2006 | Deval et al. |
| 2006/0092857 | A1 | 5/2006 | Ansari et al. |
| 2006/0114895 | A1 | 6/2006 | Anand et al. |
| 2006/0114914 | A1 | 6/2006 | Anand et al. |
| 2006/0117126 | A1 | 6/2006 | Leung et al. |
| 2006/0174242 | A1 | 8/2006 | Zhu et al. |
| 2006/0277346 | A1 | 12/2006 | Doak et al. |
| 2007/0008985 | A1 | 1/2007 | Lakshmanamurthy et al. |
| 2007/0050426 | A1 | 3/2007 | Dubal et al. |
| 2007/0055664 | A1 | 3/2007 | Michaeli et al. |
| 2007/0104102 | A1 | 5/2007 | Opsasnick |
| 2007/0104211 | A1 | 5/2007 | Opsasnick |
| 2007/0153796 | A1 | 7/2007 | Kesavan et al. |
| 2007/0195761 | A1 | 8/2007 | Tatar et al. |
| 2007/0195773 | A1 | 8/2007 | Tatar et al. |
| 2007/0208876 | A1 | 9/2007 | Davis |
| 2007/0230493 | A1 | 10/2007 | Dravida et al. |
| 2007/0236734 | A1 | 10/2007 | Okamoto |
| 2007/0280277 | A1 | 12/2007 | Lund |
| 2008/0130670 | A1 | 6/2008 | Kim et al. |
| 2008/0144662 | A1 | 6/2008 | Marcondes et al. |
| 2008/0175449 | A1 | 7/2008 | Fang et al. |
| 2008/0285571 | A1 | 11/2008 | Arulambalam et al. |

(56) References Cited

U.S. PATENT DOCUMENTS

| | | |
|---|---|---|
| 2009/0006605 A1 | 1/2009 | Chen et al. |
| 2009/0096797 A1 | 4/2009 | Du et al. |
| 2009/0106523 A1 | 4/2009 | Steiss |
| 2009/0180475 A1 | 7/2009 | Hashimoto |
| 2010/0085891 A1 | 4/2010 | Kind et al. |
| 2010/0128735 A1 | 5/2010 | Lipschutz |
| 2010/0135158 A1 | 6/2010 | Adams |
| 2010/0140364 A1 | 6/2010 | Nordberg et al. |
| 2010/0145475 A1 | 6/2010 | Bartels et al. |
| 2010/0150164 A1 | 6/2010 | Ma |
| 2010/0182920 A1 | 7/2010 | Matsuoka |
| 2010/0191951 A1 | 7/2010 | Malone et al. |
| 2010/0228733 A1 | 9/2010 | Harrison et al. |
| 2010/0238812 A1 | 9/2010 | Boutros et al. |
| 2010/0312941 A1 | 12/2010 | Aloni et al. |
| 2011/0149960 A1 | 6/2011 | Gutiérrez |
| 2012/0159235 A1 | 6/2012 | Suganthi et al. |
| 2012/0170585 A1 | 7/2012 | Mehra et al. |
| 2012/0173661 A1 | 7/2012 | Mahaffey et al. |
| 2012/0177047 A1 | 7/2012 | Roitshtein |
| 2012/0284438 A1 | 11/2012 | Zievers |
| 2013/0003556 A1 | 1/2013 | Boden et al. |
| 2013/0028265 A1 | 1/2013 | Ronchetti et al. |
| 2013/0100951 A1 | 4/2013 | Ishizuka |
| 2013/0108264 A1 | 5/2013 | Deruijter et al. |
| 2013/0163426 A1 | 6/2013 | Beliveau et al. |
| 2013/0163427 A1 | 6/2013 | Beliveau et al. |
| 2013/0163475 A1 | 6/2013 | Beliveau et al. |
| 2013/0166703 A1 | 6/2013 | Hammer et al. |
| 2013/0227051 A1 | 8/2013 | Khakpour et al. |
| 2013/0227519 A1 | 8/2013 | Maleport |
| 2013/0315054 A1 | 11/2013 | Shamis et al. |
| 2013/0318107 A1 | 11/2013 | Asaad et al. |
| 2013/0346814 A1 | 12/2013 | Zadigian et al. |
| 2014/0033489 A1 | 2/2014 | Kawashima |
| 2014/0040527 A1 | 2/2014 | Kanigicheria et al. |
| 2014/0043974 A1 | 2/2014 | Kwan et al. |
| 2014/0082302 A1 | 3/2014 | Rommelmann et al. |
| 2014/0115571 A1 | 4/2014 | Wang et al. |
| 2014/0115666 A1 | 4/2014 | Garcia Morchon et al. |
| 2014/0140342 A1 | 5/2014 | Narad |
| 2014/0181232 A1 | 6/2014 | Manula et al. |
| 2014/0204943 A1 | 7/2014 | Palmer |
| 2014/0233568 A1 | 8/2014 | Dong |
| 2014/0241359 A1 | 8/2014 | Bosshart et al. |
| 2014/0241361 A1 | 8/2014 | Bosshart et al. |
| 2014/0241362 A1 | 8/2014 | Bosshart et al. |
| 2014/0244966 A1 | 8/2014 | Bosshart et al. |
| 2014/0269432 A1 | 9/2014 | Goyal et al. |
| 2014/0301192 A1 | 10/2014 | Lee et al. |
| 2014/0321473 A1 | 10/2014 | Chen et al. |
| 2014/0328180 A1 | 11/2014 | Kim et al. |
| 2014/0328344 A1 | 11/2014 | Bosshart |
| 2014/0334489 A1 | 11/2014 | Bosshart et al. |
| 2015/0003259 A1 | 1/2015 | Gao |
| 2015/0009796 A1 | 1/2015 | Koponen et al. |
| 2015/0010000 A1 | 1/2015 | Zhang et al. |
| 2015/0020060 A1 | 1/2015 | Bandakka et al. |
| 2015/0023147 A1 | 1/2015 | Lee et al. |
| 2015/0081833 A1 | 3/2015 | Pettit et al. |
| 2015/0092539 A1 | 4/2015 | Sivabalan et al. |
| 2015/0110114 A1 | 4/2015 | Wohlgemuth et al. |
| 2015/0121355 A1 | 4/2015 | Chang et al. |
| 2015/0131666 A1 | 5/2015 | Kang et al. |
| 2015/0131667 A1 | 5/2015 | Ko et al. |
| 2015/0142932 A1 | 5/2015 | Hallivuori et al. |
| 2015/0142991 A1 | 5/2015 | Zaloom |
| 2015/0146527 A1 | 5/2015 | Kishore et al. |
| 2015/0156288 A1 | 6/2015 | Lu et al. |
| 2015/0172198 A1 | 6/2015 | Levy et al. |
| 2015/0178395 A1 | 6/2015 | Tiwari et al. |
| 2015/0180769 A1 | 6/2015 | Wang et al. |
| 2015/0195206 A1 | 7/2015 | Memon et al. |
| 2015/0222560 A1 | 8/2015 | Kakadia et al. |
| 2015/0249572 A1 | 9/2015 | Mack-Crane et al. |
| 2015/0319086 A1 | 11/2015 | Tripathi et al. |
| 2015/0363522 A1 | 12/2015 | Maurya |
| 2015/0381418 A1 | 12/2015 | Fausak et al. |
| 2015/0381495 A1 | 12/2015 | Cherian et al. |
| 2016/0014073 A1 | 1/2016 | Reddy et al. |
| 2016/0019161 A1 | 1/2016 | Patel et al. |
| 2016/0094460 A1 | 3/2016 | Shelar et al. |
| 2016/0139892 A1 | 5/2016 | Atreya et al. |
| 2016/0149784 A1 | 5/2016 | Zhang et al. |
| 2016/0173371 A1 | 6/2016 | Bays |
| 2016/0173383 A1 | 6/2016 | Liu et al. |
| 2016/0188313 A1 | 6/2016 | Dubal et al. |
| 2016/0188320 A1 | 6/2016 | Chang et al. |
| 2016/0191306 A1 | 6/2016 | Gasparakis et al. |
| 2016/0191370 A1 | 6/2016 | Wood |
| 2016/0191406 A1 | 6/2016 | Xiao et al. |
| 2016/0197852 A1 | 7/2016 | Hutchison et al. |
| 2016/0212012 A1 | 7/2016 | Young et al. |
| 2016/0232019 A1 | 8/2016 | Shah et al. |
| 2016/0234097 A1 | 8/2016 | Chang |
| 2016/0234103 A1 | 8/2016 | Kotalwar et al. |
| 2016/0241459 A1 | 8/2016 | Zheng et al. |
| 2016/0301601 A1 | 10/2016 | Anand et al. |
| 2016/0323243 A1 | 11/2016 | Levasseur et al. |
| 2016/0330127 A1 | 11/2016 | Kim et al. |
| 2016/0330128 A1 | 11/2016 | Wang |
| 2016/0337329 A1 | 11/2016 | Sood et al. |
| 2016/0342510 A1 | 11/2016 | Pani |
| 2016/0344629 A1 | 11/2016 | Gray |
| 2016/0357534 A1 | 12/2016 | Krishnamoorthi et al. |
| 2016/0359685 A1 | 12/2016 | Yadav et al. |
| 2017/0005951 A1 | 1/2017 | Labonte et al. |
| 2017/0013452 A1 | 1/2017 | Mentze et al. |
| 2017/0034082 A1 | 2/2017 | Pfaff |
| 2017/0041209 A1 | 2/2017 | Joshi et al. |
| 2017/0048144 A1 | 2/2017 | Liu |
| 2017/0053012 A1 | 2/2017 | Levy et al. |
| 2017/0063690 A1 | 3/2017 | Bosshart |
| 2017/0064047 A1 | 3/2017 | Bosshart |
| 2017/0075692 A1 | 3/2017 | Naresh et al. |
| 2017/0085414 A1 | 3/2017 | Castaldelli et al. |
| 2017/0085477 A1 | 3/2017 | Li et al. |
| 2017/0085479 A1 | 3/2017 | Wang et al. |
| 2017/0091258 A1 | 3/2017 | Rajahalme |
| 2017/0093707 A1 | 3/2017 | Kim et al. |
| 2017/0093986 A1 | 3/2017 | Kim et al. |
| 2017/0093987 A1 | 3/2017 | Kaushalram et al. |
| 2017/0118041 A1 | 4/2017 | Bhattacharya et al. |
| 2017/0118042 A1 | 4/2017 | Bhattacharya et al. |
| 2017/0126588 A1 | 5/2017 | Anand et al. |
| 2017/0134282 A1 | 5/2017 | Agarwal et al. |
| 2017/0134310 A1 | 5/2017 | Koladi et al. |
| 2017/0142000 A1 | 5/2017 | Cai et al. |
| 2017/0142011 A1 | 5/2017 | Zhang et al. |
| 2017/0180273 A1 | 6/2017 | Daly et al. |
| 2017/0195229 A1 | 7/2017 | Ulas et al. |
| 2017/0208015 A1 | 7/2017 | Volkening et al. |
| 2017/0220499 A1 | 8/2017 | Gray |
| 2017/0222881 A1 | 8/2017 | Holbrook et al. |
| 2017/0223575 A1 | 8/2017 | Duda et al. |
| 2017/0251077 A1 | 8/2017 | Eerpini et al. |
| 2017/0264571 A1 | 9/2017 | Aibester et al. |
| 2017/0289034 A1 | 10/2017 | Bosshart et al. |
| 2018/0006945 A1 | 1/2018 | Flajslik et al. |
| 2018/0006950 A1 | 1/2018 | Flajslik et al. |
| 2018/0054385 A1 | 2/2018 | Dharmapurikar et al. |
| 2018/0115478 A1 | 4/2018 | Kim et al. |
| 2018/0124183 A1 | 5/2018 | Kozat et al. |
| 2018/0191640 A1 | 7/2018 | Calderon et al. |
| 2018/0234340 A1 | 8/2018 | Kim et al. |
| 2018/0234355 A1 | 8/2018 | Kim et al. |
| 2018/0262424 A1 | 9/2018 | Roeland et al. |
| 2018/0287819 A1 | 10/2018 | Mayer-Wolf et al. |
| 2018/0316549 A1 | 11/2018 | Gasparakis et al. |
| 2018/0375755 A1 | 12/2018 | Joshi et al. |
| 2019/0394086 A1 | 12/2019 | Gasparakis et al. |
| 2020/0007473 A1 | 1/2020 | Kim et al. |
| 2020/0021486 A1 | 1/2020 | Gasparakis et al. |
| 2020/0076737 A1 | 3/2020 | Bosshart |

(56) References Cited

U.S. PATENT DOCUMENTS

| | | | |
|---|---|---|---|
| 2020/0084093 A1 | 3/2020 | Gasparakis et al. |
| 2020/0099617 A1 | 3/2020 | Bosshart |
| 2020/0099618 A1 | 3/2020 | Bosshart |
| 2020/0099619 A1 | 3/2020 | Bosshart |
| 2020/0228433 A1 | 7/2020 | Lee |
| 2020/0244576 A1 | 7/2020 | Wetterwald et al. |
| 2020/0280428 A1 | 9/2020 | Kovacs et al. |
| 2020/0280518 A1 | 9/2020 | Lee et al. |

FOREIGN PATENT DOCUMENTS

| | | |
|---|---|---|
| EP | 3229424 A1 | 10/2017 |
| WO | 2013101024 | 7/2013 |
| WO | 2017112165 | 6/2017 |

OTHER PUBLICATIONS

Non-Published commonly owned U.S. Appl. No. 15/835,235, filed Dec. 7, 2017, 36 pages, Barefoot Networks, Inc.
Non-Published commonly owned U.S. Appl. No. 15/835,238, filed Dec. 7, 2017, 69 pages, Barefoot Networks, Inc.
Non-Published commonly owned U.S. Appl. No. 15/835,242, filed Dec. 7, 2017, 69 pages, Barefoot Networks, Inc.
Non-Published commonly owned U.S. Appl. No. 15/835,247, filed Dec. 7, 2017, 68 pages, Barefoot Networks, Inc.
Advisory Action for U.S. Appl. No. 15/835,238, dated Nov. 22, 2019, 3 pages.
Final Office Action for U.S. Appl. No. 15/888,050, dated Dec. 12, 2019.
Notice of Allowance for U.S. Appl. No. 14/836,850, dated Jun. 20, 2017.
Notice of Allowance for U.S. Appl. No. 15/729,555, dated May 2, 2019.
Notice of Allowance for U.S. Appl. No. 15/784,191, dated Aug. 31, 2021.
Notice of Allowance for U.S. Appl. No. 15/835,233, dated Jul. 3, 2019, 8 pages.
Notice of Allowance for U.S. Appl. No. 15/835,233, dated Oct. 29, 2019.
Notice of Allowance for U.S. Appl. No. 15/835,238, dated Sep. 30, 2020.
Notice of Allowance for U.S. Appl. No. 15/835,249, dated Jul. 25, 2019.
Notice of Allowance for U.S. Appl. No. 16/519,873, dated Aug. 30, 2021.
Notice of Allowance for U.S. Appl. No. 16/582,798, dated Aug. 27, 2021.
Notice of Allowance for U.S. Appl. No. 16/687,271, dated Aug. 30, 2021.
Office Action for U.S. Appl. No. 14/863,961, dated Jun. 16, 2017.
Office Action for U.S. Appl. No. 15/835,233, dated Feb. 8, 2019, 17 pages.
Office Action for U.S. Appl. No. 15/835,238, dated Dec. 11, 2019.
Office Action for U.S. Appl. No. 15/835,238, dated Feb. 7, 2019.
Office Action for U.S. Appl. No. 15/835,238, dated Jun. 19, 2019.
Office Action for U.S. Appl. No. 15/835,238, dated Jun. 5, 2020.
Office Action for U.S. Appl. No. 15/835,247, dated Dec. 31, 2018, 18 pages.
Office Action for U.S. Appl. No. 15/835,247, dated Jul. 10, 2019.
Office Action for U.S. Appl. No. 15/835,249, dated Dec. 31, 2018.
Office Action for U.S. Appl. No. 15/888,050, dated Jun. 11, 2019.
Office Action for U.S. Appl. No. 16/569,554, dated Sep. 27, 2021.
Office Action for U.S. Appl. No. 16/573,847 dated Jan. 6, 2021.
Office Action for U.S. Appl. No. 16/573,847, dated Aug. 2, 2021.
Office Action for U.S. Appl. No. 16/695,044, dated Jul. 8, 2021.
Office Action for U.S. Appl. No. 16/695,049, dated Jul. 21, 2021.
Office Action for U.S. Appl. No. 16/695,053 dated Aug. 4, 2021.
Office Action for U.S. Appl. No. 16/804,960, dated Aug. 19, 2021.
Office Action for U.S. Appl. No. 16/804,960, dated May 12, 2021.
"Selection of Cyclic Redundancy Code and Checksum Algorithms to Ensure Critical Data Integrity", Federal Aviation Administration William J. Hughes Technical Center Aviation Research Division Atlantic City International Airport New Jersey 08405, DOT/FAA/TC-14/49, Mar. 2015, 111 pages.
Arashloo, Mina Tahmasbi, et al., "SNAP: Stateful Network-Wide Abstractions for Packet Processing", SIGCOMM '16, Aug. 22-26, 2016, 27 pages, ACM, Florianopolis, Brazil.
Kaufmann, A., et al., "High Performance Packet Processing with FlexNIC", ASPLOS'16, Apr. 2-6, 2016, 15 pages, ACM, Atlanta, GA, USA.
Moshref, Masoud, et al., "Flow-level State Transition as a New Switch Primitive for SON" HotSDN'14, Aug. 22, 2014, 6 pages, ACM, Chicago, IL, USA.
Sivaraman, A., et al., "Towards Programmable Packet Scheduling", HotNets'15, Nov. 16-17, 2015, 7 pages, ACM, Philadelphia, PA, USA.
Sivaraman, Anirudh, et al., "Packet Transactions: A Programming Model for Data-Plane Algorithms at Hardware Speed", arXiv:1512.05023v1, Dec. 16, 2015, 22 pages.
Sivaraman, Anirudh, et al., "Packet Transactions: High-level Programming for Line-Rate Switches", ?rXiv:1512.05023v2, Jan. 30, 2016, 16 pages.
Sivaraman, Anirudh, et al., "Packet Transactions: High-level Programming for Line-Rate Switches", SIGCOMM'16, Aug. 22-26, 2016, 14 pages, ACM, Florianopolis, Brazil.
Sivaraman, Anirudh, et al., "Programmable Packet Scheduling at Line Rate", SIGCOMM'16, Aug. 22-26, 2016, 14 pages, ACM, Florianopolis, Brazil.
Song, "Protocol-Oblivious Forwarding: Unleashe the Power of SDN through a Future-Proof Forwarding Plane", Huawei Technologies, USA, 6 pages.
Final Office Action for U.S. Appl. No. 16/695,044, dated Dec. 20, 2021.
International Preliminary Report on Patentability for PCT Application No. PCT/US2016/062511, dated Jun. 26, 2018.
International Search Report and Written Opinion for PCT Application No. PCT/US2016/062511, dated Feb. 28, 2017.
Notice of Allowance for U.S. Appl. No. 14/977,810, dated Oct. 20, 2017.
Notice of Allowance for U.S. Appl. No. 15/784,192, dated Sep. 30, 2021.
Notice of Allowance for U.S. Appl. No. 15/835,247 dated Dec. 29, 2021.
Notice of Allowance for U.S. Appl. No. 15/878,966, dated May 15, 2019.
Notice of Allowance for U.S. Appl. No. 16/460,798, dated May 27, 2021.
Notice of Allowance for U.S. Appl. No. 16/519,873, dated Dec. 3, 2021.
Notice of Allowance for U.S. Appl. No. 16/573,847, dated Dec. 15, 2021.
Notice of Allowance for U.S. Appl. No. 16/582,798, dated Dec. 1, 2021.
Notice of Allowance for U.S. Appl. No. 16/687,271, dated Dec. 1, 2021.
Notice of Allowance for U.S. Appl. No. 16/695,049, dated Jan. 5, 2022.
Office Action for Chinese Patent Application No. 201680075637.4, dated Mar. 2, 2021.
Office Action for Chinese Patent Application No. 201680075637.4, dated Sep. 23, 2021.
Office Action for U.S. Appl. No. 15/878,966, dated Jan. 11, 2019.
Office Action for U.S. Appl. No. 14/977,810, dated Jun. 29, 2017.
Office Action for U.S. Appl. No. 16/4670,798, dated Nov. 18, 2020.
Office Action for U.S. Appl. No. 16/695,053 dated Jan. 5, 2022.
Office Action for U.S. Appl. No. 16/804,960, dated Dec. 13, 2021.

EXPANSION OF PACKET DATA WITHIN PROCESSING PIPELINE

CLAIM OF BENEFIT TO PRIOR APPLICATIONS

This application is a continuation of U.S. patent application Ser. No. 15/835,233, filed Dec. 7, 2017. U.S. patent application Ser. No. 15/835,233 claims the benefit of U.S. Provisional Patent Application 62/564,659, filed Sep. 28, 2017. The entire specifications of all of those patent applications are hereby incorporated herein by reference in their entirety.

BACKGROUND

Certain configurable hardware switches use a match-action paradigm, passing a packet header vector between multiple stages. To properly carry out the configured instructions, in addition to carrying packet header values, the packet header vector is used to also store metadata (including control and data flow) and instructions from one stage to the next. As packet size becomes larger and/or operations become more complex, additional storage may be needed. However, simply enlarging the packet header vector may not be optimal, as this expands the number of wires and thus requires more physical design area.

BRIEF SUMMARY

Some embodiments of the invention provide a network forwarding integrated circuit (IC) with a packet processing pipeline that uses multiple different types of data containers to pass packet data through the pipeline. In some embodiments, the different types of data containers (i) have different availability to match-action stages of the pipeline and (ii) have their data values generated differently by the match-action stages of the pipeline.

The network forwarding IC of some embodiments includes a set of configurable packet processing pipeline resources that operate as both ingress pipelines (for packets received at the network forwarding IC) and egress pipelines (for packets being sent from the network forwarding IC), in addition to a traffic management unit that is responsible for receiving packets from an ingress pipeline and enqueuing the packet for a port associated with an egress pipeline. Typically, a packet is processed by an ingress pipeline, enqueued by the traffic management unit (which may also perform packet replication, if necessary), and processed by an egress pipeline.

Each packet processing pipeline (whether acting as an ingress or egress pipeline) includes a parser, a match-action unit (a series of match-action stages), and a deparser, in some embodiments. The parser receives a packet as an ordered stream of data, and based on its instructions and analysis of the packet, identifies packet header fields and stores the packet header fields in a set of data containers (a packet header vector (PHV)) to be sent to the match-action unit. The match-action unit performs various processing to determine actions to be taken on the packet, including modifying the PHV data, determining output instructions for the packet, etc. After the last match-action stage, the PHV is provided to the deparser, so that the deparser can reconstruct the packet.

As mentioned, in some embodiments, this PHV includes multiple different types of data containers. Specifically, in some embodiments, a first type of data container is fully available for match-related operations, a second type of data container is only available for match-related operations in certain situations, and a third type of data container is not available at all for the match-related operations. Specifically, data containers of the first and second types can be used to match against match table entries and/or to generate hashes for matching against match table entries. In addition, each match-action stage of some embodiments includes a set of data-plane stateful processing units (DSPUs) and stateful tables that these DSPUs access and modify, and the first and second types of data containers are made available to the DSPU for these operations, while the third type of data containers are not. Additional match-related operations, such as passing table addresses to later match-action stages, also cannot use the third type of data container in some embodiments.

While the first type of data container is available for all match-related operations, in some embodiments the second type of data container is only available for certain stages. Specifically, when the operations of a match-action stage do not depend on the output of the previous match-action stage, some embodiments run the two stages in parallel. In this case, the data containers of the second type will not have been provided yet to the latter of these two subsequent stages, and thus are not available for the match-related operations. However, if the latter of these two stages is dependent on the previous stage, then the second-type data containers will have been populated for the stage and are available for the match-related operations.

In addition, each of the match-action stages generates output values for the different types of data containers in a different way in some embodiments. Each match-action stage includes a set of arithmetic logic units (ALUs) that are used to generate the output values for the first-type data containers, while the output values for the second-type and third-type data containers are generated without the ALUs. In some embodiments, each of the ALUs uses two operands output by a multiplexer (as well as a set of instructions) to generate one output value for a first-type data container. For the second-type and third-type data containers, the two operands output by the multiplexer are each an output data container value (one of the first type and one of the second type).

The multiplexer that generates the operands for the ALUs as well as the outputs for the second-type and third-type data containers enables the movement of data values between the different types of data containers. Thus, while the values stored in the third-type data containers are not available for matching in a particular stage, these values can be moved to a different type of data container for use in match and/or action operations at a later stage. As an example, if a routing decision using a destination IP address is not made until late in the match-action unit, then the destination IP address value could be moved to a third-type data container at one of the early stages to free up room in the first-type and second-type data containers for values used in the earlier stages. Before the stage(s) at which the destination IP address is required, one of the stages would move the value to one of the first-type or second-type data containers.

The use of the multiple types of data containers enables the expansion of the size of the PHV within the match-action unit, without a corresponding expansion in either (i) the size of the PHV output by the parser or provided to the deparser or (ii) the number of wires required to transfer the PHV data from stage to stage. The parser outputs a first number of PHV data containers (including first-type and second-type containers), and then the first match-action stage expands the PHV to a second (larger) number of PHV data containers (adding the third-type containers). Each of the intermediate stages of the match-action unit receives the expanded PHV, potentially modifies the values of the PHV, and passes the expanded PHV to the next stage. At the last stage, the PHV is reduced back to the first number of data containers (including first-type and second-type containers), and provided to the deparser. In some embodiments, to the parser and deparser, the first-type and second-type containers are the same. In addition, the last stage in some embodiments outputs all of the data containers as first-type containers, in that the ALUs are used to generate all of the outputs of the last stage.

As mentioned, the use of these different types of containers avoids expanding the number of wires required to transfer the PHV data from stage to stage. In some embodiments, each match-action on the network forwarding IC has a given number of wires passing over the stage, with the first set of wires for carrying the input PHV bits and a second set of wires for carrying the output PHV bits. This enables the PHV to be forwarded to the next stage before processing when that next stage is not dependent on the current stage outputs. In addition, the second-type and/or third-type data container bits use some of the input wires as output wires (with fewer input wires needed due to the restrictions on the second-type and third-type data containers).

This expansion of the PHV data enables a compiler to make optimal use of the different types of PHV data containers for different applications. In some embodiments, the MAU stages are configured by a controller according to a compiled program (or multiple compiled programs, such as an ingress program and an egress program). The compiler receives a program or set of programs (e.g., P4 programs) and assigns different parameters to the various PHV data containers available for each stage. In a typical program, not all of the parameters are needed for matching at each stage, and similarly not all of the parameters need to be used as operands for the ALUs at each stage. The program requirements determine the specific types of data containers required at each stage for each program, and the expansion of the number of PHV data containers enables the compiler to accommodate a larger number of parameters without a significant hardware expansion.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide a network forwarding integrated circuit (IC) with a packet processing pipeline that uses multiple different types of data containers to pass packet data through the pipeline. In some embodiments, the different types of data containers (i) have different availability to match-action stages of the pipeline and (ii) have their data values generated differently by the match-action stages of the pipeline.

Figure 1:
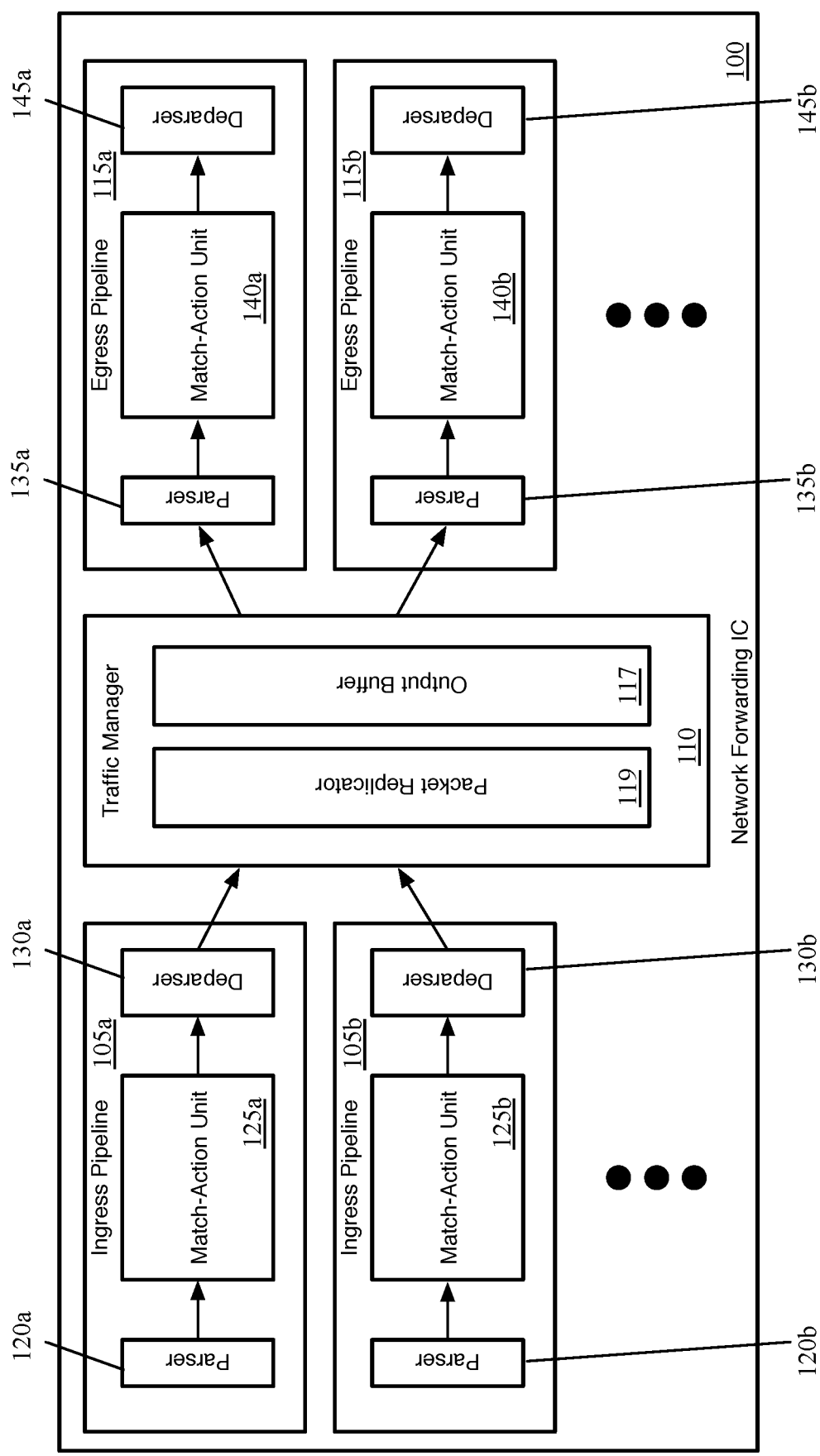
FIG. 1 conceptually illustrates the structure of a network forwarding IC of some embodiments.

FIG. 1 conceptually illustrates the structure of such a network forwarding IC 100 of some embodiments (that is, e.g., incorporated into a hardware forwarding element). Specifically, FIG. 1 illustrates several ingress pipelines 105, a traffic management unit (referred to as a traffic manager) 110, and several egress pipelines 115. Though shown as separate structures, in some embodiments the ingress pipelines 105 and the egress pipelines 115 actually use the same circuitry resources, which is configured to handle both ingress and egress pipeline packets synchronously (possibly in addition to non-packet data). That is, a particular stage of the pipeline may process an ingress packet, an egress packet, both, or neither in the same clock cycle. However, in other embodiments, the ingress and egress pipelines are separate circuitry.

Generally, when the network forwarding IC 100 receives a packet, in some embodiments the packet is initially directed to one of the ingress pipelines 105 (each of which may correspond to one or more ports of the hardware forwarding element). After passing through the selected ingress pipeline 105, the packet is sent to the traffic manager 110, where the packet is enqueued and placed in the output buffer 117. In some embodiments, the ingress pipeline 105 that processes the packet specifies into which queue the packet should be placed by the traffic manager 110 (e.g., based on the destination of the packet). The traffic manager 110 then dispatches the packet to the appropriate egress pipeline 115 (each of which may correspond to one or more ports of the forwarding element). In some embodiments, there is no necessary correlation between which of the ingress pipelines 105 processes a packet and to which of the egress pipelines 115 the traffic manager 110 dispatches the packet. That is, a packet might be initially processed by ingress pipeline 105b after receipt through a first port, and then subsequently by egress pipeline 115a to be sent out a second port, etc.

Each ingress pipeline 105 includes a parser 120, a match-action unit (MAU) 125, and a deparser 130. Similarly, each egress pipeline 115 includes a parser 135, a MAU 140, and a deparser 145. The parser 120 or 135, in some embodiments, receives a packet as a formatted collection of bits in a particular order, and parses the packet into its constituent header fields. The parser starts from the beginning of the packet and assigns these header field values to fields (e.g., data containers) of a packet header vector (PHV) for processing. In some embodiments, the parser 120 or 135 separates out the packet headers (up to a designated point) from the payload of the packet, and sends the payload (or the entire packet, including the headers and payload) directly to the deparser without passing through the MAU processing.

The MAU 125 or 140 performs processing on the packet data (i.e., the PHV). In some embodiments, the MAU includes a sequence of stages, with each stage including one or more match tables, a set of stateful processing units, and an action engine. Each match table includes a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage performs the actions on the PHV, which is then sent to the next stage of the MAU. In some embodiments, the PHV includes different types of data containers, which have different properties in terms of the types of operations that can be performed using the data stored in the containers and how the values are output into the PHV containers for the next stage. The MAU stages are described in more detail below by reference to FIGS. 2 and 3.

The deparser 130 or 145 reconstructs the packet using the PHV as modified by the MAU 125 or 140 and the payload received directly from the parser 120 or 135. The deparser constructs a packet that can be sent out over the physical network, or to the traffic manager 110. In some embodiments, the deparser constructs this packet based on data received along with the PHV that specifies the protocols to include in the packet header, as well as its own stored list of data container locations for each possible protocol's header fields.

The traffic manager 110, as shown, includes a packet replicator 119 and the previously-mentioned output buffer 117. In some embodiments, the traffic manager 110 may include other components, such as a feedback generator for sending signals regarding output port failures, a series of queues and schedulers for these queues, queue state analysis components, as well as additional components. The packet replicator 119 of some embodiments performs replication for broadcast/multicast packets, generating multiple packets to be added to the output buffer (e.g., to be distributed to different egress pipelines).

The output buffer 117 is part of a queuing and buffering system of the traffic manager in some embodiments. The traffic manager 110 provides a shared buffer that accommodates any queuing delays in the egress pipelines. In some embodiments, this shared output buffer 117 stores packet data, while references (e.g., pointers) to that packet data are kept in different queues for each egress pipeline 115. The egress pipelines request their respective data from the common data buffer using a queuing policy that is control-plane configurable. When a packet data reference reaches the head of its queue and is scheduled for dequeuing, the corresponding packet data is read out of the output buffer 117 and into the corresponding egress pipeline 115. In some embodiments, packet data may be referenced by multiple pipelines (e.g., for a multicast packet). In this case, the packet data is not removed from this output buffer 117 until all references to the packet data have cleared their respective queues.

Figure 2:
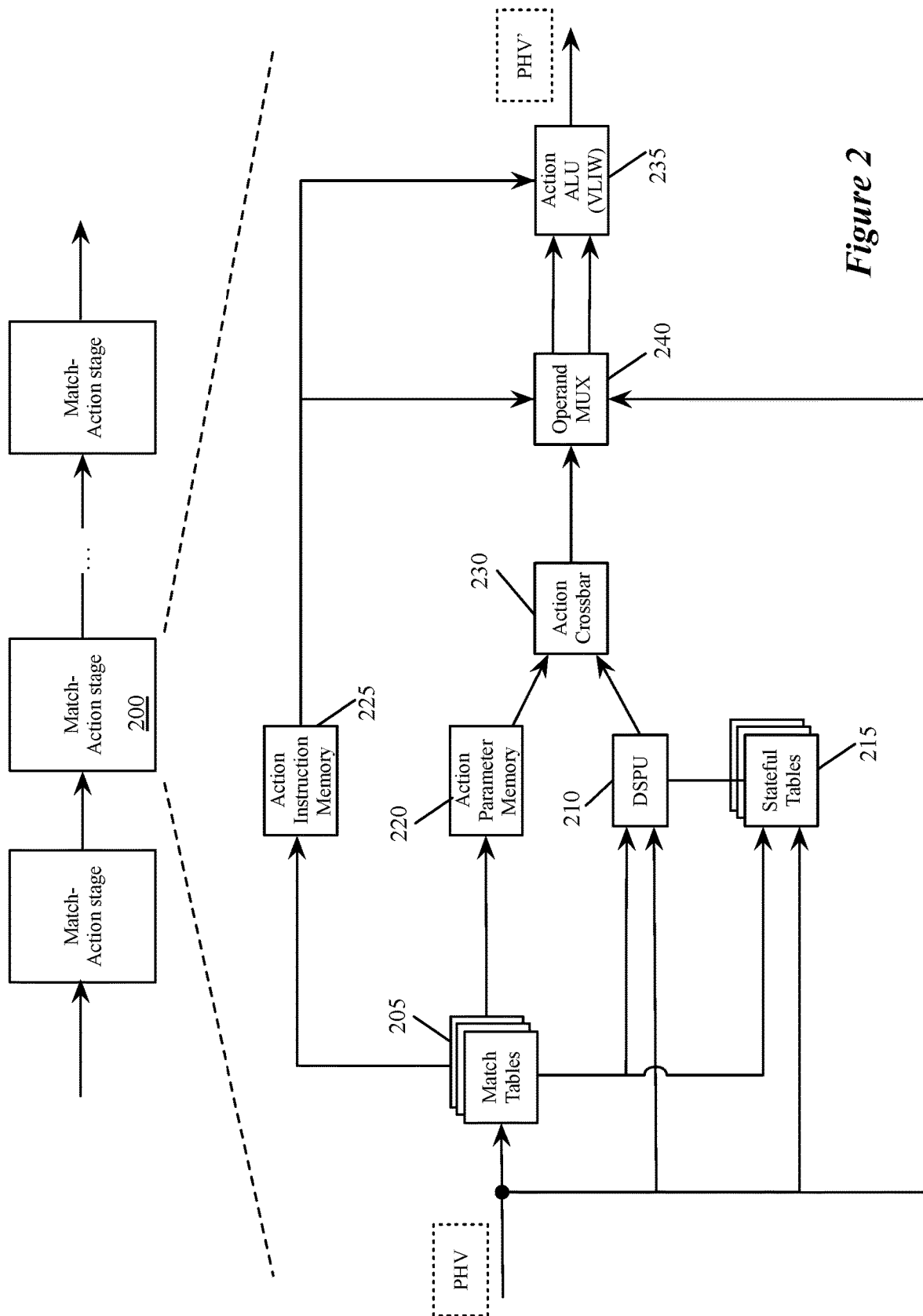
FIG. 2 illustrates an example of a match-action unit of some embodiments.

FIG. 2 illustrates an example of a match-action unit of some embodiments. As mentioned above, a packet processing pipeline of some embodiments has several MAU stages, each of which includes packet-processing circuitry for forwarding received data packets and/or performing stateful operations based on these data packets. These operations are performed by processing values stored in the PHVs of the packets. This figure illustrates, in part, the flow of data for a PHV container through the match-action unit 200.

As mentioned, the PHV includes multiple data containers, possibly of different sizes, that are used to store packet header field values and other data (e.g., metadata, instructions, etc.) within the match-action unit. In some embodiments, packet header field values may be stored in a single container or may be mapped across containers (e.g., a 48-bit MAC address could be stored in a combination of a 32-bit data container and a 16-bit data container). In some cases, a single data container may store multiple packet header field values or other data (e.g., storing both the time to live and protocol field values of an IP header in a single 16-bit data container).

In some embodiments, the PHV has a fixed number of data containers of specific sizes (e.g., 8-bit data containers, 16-bit data containers, and 32-bit data containers), which are described in further detail by reference to FIG. 7. These data containers, in some embodiments, have the capacity to carry data for both an ingress packet and an egress packet (and non-packet data processed separately from the ingress or egress packets, in some cases). In addition, the PHV data containers are divided into groups in some embodiments, with the groups of data containers being processed together by certain parts of the match-action stages. Each group within the MAU, in some embodiments, includes three types of data containers.

FIG. 2 illustrates the operations of some embodiments applied to a first type of PHV data container. In some embodiments, the first type of data container is fully available for certain match-related operations, a second type of data container is only available for these match-related operations in certain situations, and a third type of data container is not available at all for these match-related operations. In addition, each of the match-action stages generates output values for the different types of PHV containers in some embodiments, as explained further below.

As shown in FIG. 2, the MAU stage 200 in some embodiments has a set of one or more match tables 205, a data plane stateful processing unit 210 (DSPU), a set of one or more stateful tables 215, an action crossbar 230, an action parameter memory 220, an action instruction memory 225, and an action arithmetic logic unit (ALU) 235. The match table set 205 can compare one or more fields in a received PHV (i.e., values stored in one or more PHV containers) to identify one or more matching flow entries (i.e., entries that match the PHV). The match table set can be TCAM tables or exact match tables in some embodiments. In some embodiments, the match table set is accessed at a memory address that is a value extracted from one or more data containers of the PHV, or a hash of this extracted value or values.

In some embodiments, the value stored in a match table record that matches a packet's flow identifier, or that is accessed at a hash-generated address, provides addresses for locations in the action parameter memory 220 and action instruction memory 225. In addition, such a value from the match table can provide an address and/or parameter for one or more records in the stateful table set 215, and can provide an instruction and/or parameter for the DSPU 210.

In some embodiments, each action table 215, 220, and 225 can be addressed through a direct addressing scheme, an indirect addressing scheme, or an independent addressing scheme, depending on the configuration of the MAU stage. In the direct addressing scheme, the action table uses the same address that is used to address the matching flow entry in the match table set 205 (e.g., a hash generated address value or a value from the PHV). On the other hand, the indirect addressing scheme accesses an action table by using an address value that is extracted from one or more records that are identified in the match table set 205 (i.e., identified in the match table set via direct addressing or record matching operations). The independent address scheme of some embodiments is similar to the direct addressing scheme except that it does not use the same address that is used to access the match table set 205. Like the direct addressing scheme, the table address in the independent addressing scheme can either be a value extracted from the PHV, or a hash of this extracted value. In some embodiments, not all the action tables 215, 220 and 225 can be accessed through these three addressing schemes (e.g., the action instruction memory 225 in some embodiments is accessed through only the direct and indirect addressing schemes).

As shown, the DSPU 210 and the stateful table set 215 also receive the input PHV values (at least the values from the first-type data containers, and in some cases values from the second-type data containers). The PHV data containers can store instructions and/or parameters for the DSPU as well as memory addresses and/or parameters for the stateful table set 215, in addition to packet header field values. Such instructions, parameters, and memory/addresses are calculated in previous match-action stages and stored to the PHV data containers in some embodiments.

The DSPU 210 in some embodiments performs one or more stateful operations, while a set of stateful tables 215 stores state data used and generated by the DSPU 210. In some embodiments, the DSPU is a programmable arithmetic logic unit (ALU) or set of programmable ALUs that performs operations synchronously with the dataflow of the packet-processing pipeline (i.e., synchronously at the line rate). As such, the DSPU can process a different PHV (or one ingress and one egress PHV) every clock cycle, thus ensuring that the DSPU is able to operate synchronously with the dataflow of the packet-processing pipeline. In some embodiments, a DSPU performs every computation with fixed latency (e.g., fixed number of clock cycles). In some embodiments, the remote or local control plane provides configuration data to program the DSPU.

The DSPU 210 outputs an action parameter to the action crossbar 230. The action parameter memory 220 also outputs an action parameter to this crossbar 230. The action parameter memory 220 retrieves the action parameter that it outputs from the record identified by the address provided by the match table set 205, based on a matched entry in the match table set 205. These action parameters, in some embodiments, are constants or other values that are either (i) output as PHV values or (ii) used to perform a calculation in order to generate an output PHV value.

The action crossbar 230 in some embodiments maps the action parameters received from the DSPU 210 and action parameter memory 220 to an action parameter bus 240. For different data packets, the action crossbar 230 can map the action parameters from DSPU 210 and memory 220 differently to this bus 240. The crossbar can supply the action parameters from either of these sources in their entirety to this bus 240, or it can concurrently select different portions of these parameters for this bus.

This bus provides the action parameter to an operand multiplexer (MUX) 240. The operand MUX 240 receives the action parameter from the action crossbar 230, as well as the values from the input PHV containers. Based on instructions from the action instruction memory 225, the operand MUX 240 provides operands to the action ALU 235.

The action ALU 235 also receives an instruction to execute from the action instruction memory 225, which specifies the calculations to perform on the operands received from the operand MUX 240. The action instruction memory 225, like the action parameter memory 220, retrieves the instructions that it outputs (to the operand MUX 240 and the action ALU 235) from the record identified by the address provided by the match table set 205. In some embodiments, the action ALU 240 in some embodiments is a very large instruction word (VLIW) processor. The action ALU 240 executes the instructions (from the instruction memory 235 or, in some embodiments, the PHV) using the operands received from the operand MUX 240 (i.e., from the action crossbar 230 or the PHV).

In some embodiments, the action ALU 235 is actually a number of ALUs, one for each PHV data container of the first type. Specifically, each ALU 235 receives two operands from the operand MUX 240, which it uses to calculate one output PHV data container in accordance with its received instructions. The value stored in the output PHV data container may be as simple as one of the operands (e.g., the same value stored in the corresponding input PHV data container, a value from a different input PHV data container, a value from the stateful tables 215 or action parameter memory 220) or could involve a calculation involving both operands (e.g., decrementing the time to live value by subtracting a constant 1 received from the action parameter memory from the input time to live value). This output PHV data container is passed to the next stage (i.e., as an input PHV data container for that next stage).

Figure 3:
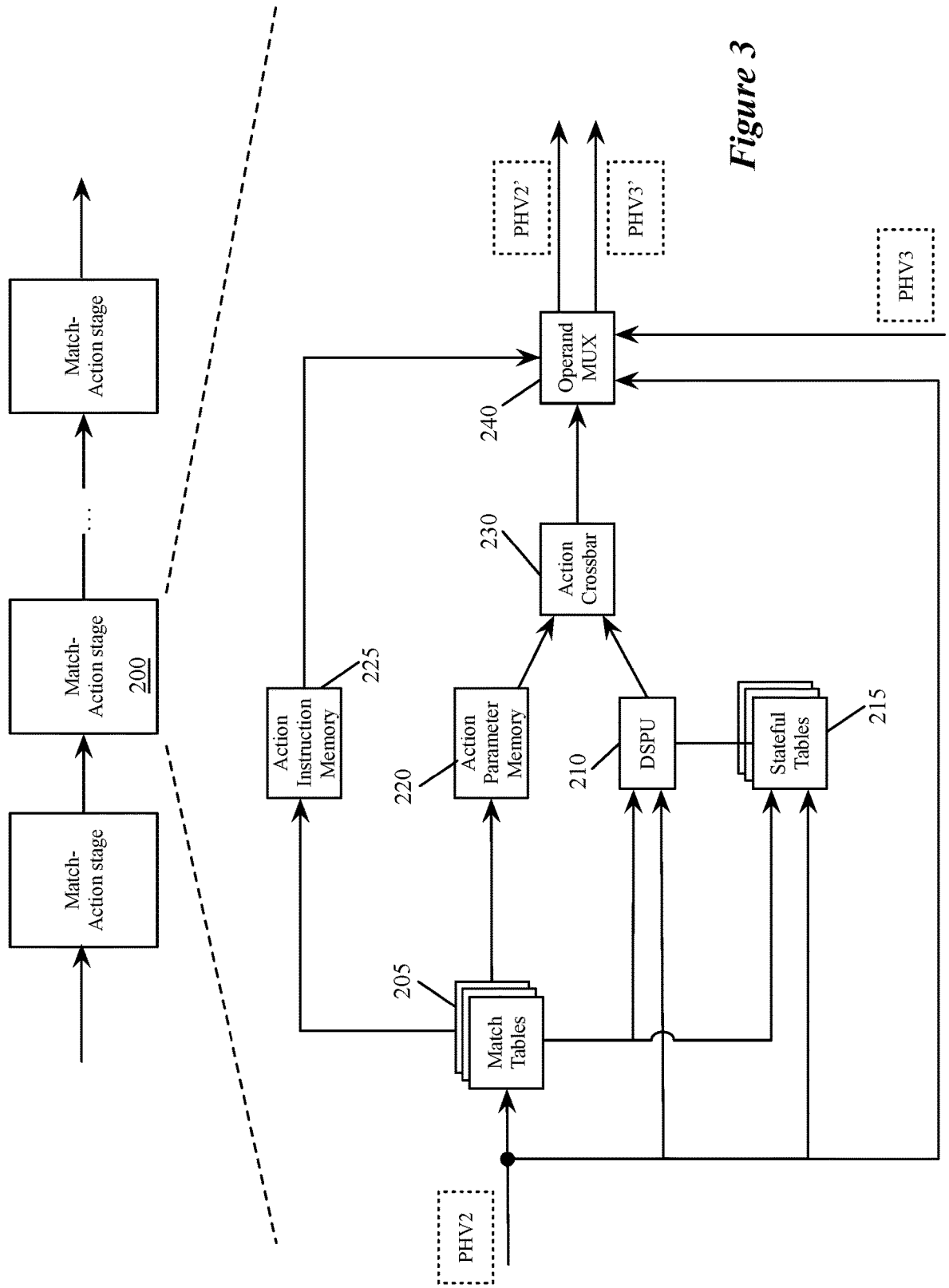
FIG. 3 illustrates the operation of a match-action stage with respect to second-type and third-type PHV data containers.

As mentioned, FIG. 2 illustrates the operation of the match-action stage 200 with respect to a first-type PHV data container of some embodiments. FIG. 3 illustrates the operation of this match-action stage with respect to second-type and third-type PHV data containers. As shown, the second-type PHV data is provided to the match tables 205, DSPU 210, and state tables 215, as with the first-type PHV data.

However, in some embodiments, the values in the second-type PHV data containers are only useable for matching operations (i.e., lookups in the match tables, stateful operations with the DSPU and stateful tables) if the match-action stage has a dependency on the previous stage. When the operations of a match-action stage do not depend on the output of the previous match-action stage, some embodiments run the two match-action stages in parallel, with the first-type data containers provided to both stages in the same clock cycle (or provided to the later of the stages within a small number of transport clock cycles of the provision to the prior of the stages). In this case, the data containers of the second type will not have been provided yet to the latter of these two subsequent stages, and thus are not available for the match table, DSPU, and stateful table operations. However, if the latter of these two stages is dependent on the previous stage, then the second-type data containers will have been populated for the stage and are available at the same time as the first-type data containers. The third-type data containers are not provided to the match-tables 205, DSPU 210, or state tables 215, and instead are only provided to the operand MUX 240.

If the second-type PHV data containers are used for match operations, this data is used along with the data in the first-type containers. That is, although shown in two separate figures for explanatory purposes, in some embodiments the match tables 205, DSPU 210, and stateful tables 215 receive all of the first-type and second-type PHV containers (assuming the second-type PHV data is available based on a dependency) and can perform their operations using any of this data.

The match-action stage 200 generates output values for the second-type and third-type data containers differently than the first-type data containers in some embodiments. As described above, the operand MUX 240 provides two operands to each action ALU 235, which uses the operands to generate the output value for a first-type PHV data container. On the other hand, no action ALU is present for the second-type and third-type PHVs. Instead, two outputs of the operand MUX 240 are used as one second-type PHV output and one third-type PHV output.

The input third-type PHV data containers, as shown, are only input to the operand MUX 240, and thus the only operations that can be performed on this data is to copy the value to another data container (e.g., to a first-type container or second-type container, or in some cases to a different third-type container) for use in a later match-action stage. The operand MUX 240, in some embodiments, receives all of the input PHVs (first-type, second-type, and third-type) as well as the values from the action crossbar 230, and outputs pairs of operands to either the action ALUs 235 (for calculation of the first-type output PHV values) or as second-type and third-type output PHV values. In some embodiments, additional restrictions require that the third-type PHV container output values can only be sourced from PHV container input values (of any of the three types), while the second-type PHV container output values (as well as the operands for the action ALUs calculating the first-type values) can be sourced from the PHV container input values as well as the action and constant values provided via the action crossbar 230. Some embodiments use multiple operand MUXes 240 for separate groups of PHV data containers (e.g., groups that include specific numbers of first-type, second-type, and third-type PHV data containers). In this case, values can be copied from one PHV data container to another within a group, but not between groups. In addition, in some embodiments, values can be copied from one PHV data container to a second PHV data container without affecting the value in the first container (i.e., the first and second output PHV containers would both store the value from the first input PHV container in this case).

Figure 4:
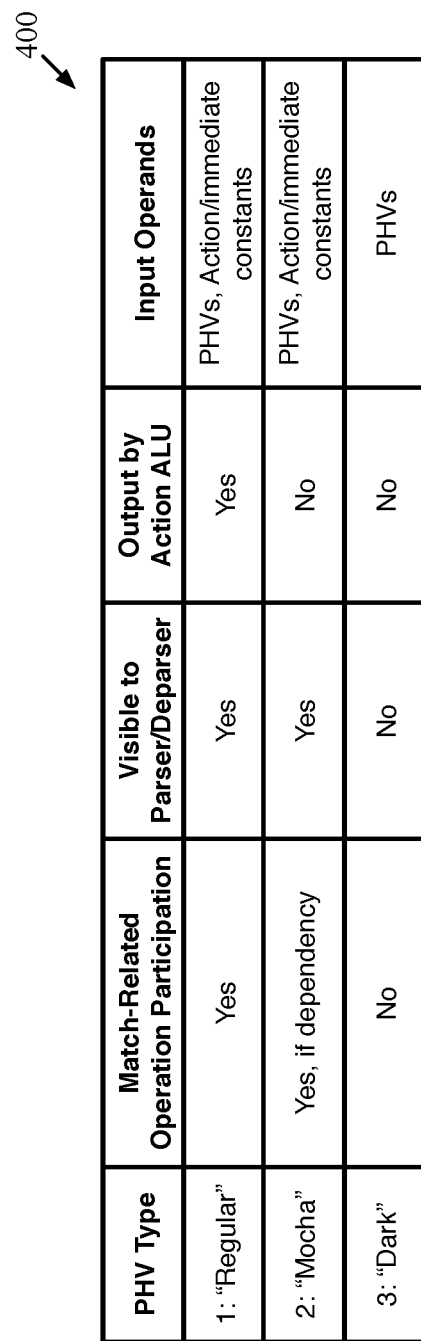
FIG. 4 illustrates a summary chart of the properties of the three types of PHV data containers of some embodiments.

FIG. 4 illustrates a summary chart 400 of the properties of the three types of PHV data containers of some embodiments, which may also be referred to as regular PHV (first-type), mocha PHV (second-type), and dark PHV (third-type). As described above, in some embodiments these PHV data container types differ in terms of (i) whether the input PHV can be used for match-related operations, whether the data containers are visible to the parser and deparser, (iii) whether the output value is generated by the VLIW action ALUs, and which input operands may be used for the output values.

As shown, the first-type PHV containers fully participate in match-related operations, while the second-type PHV containers only participate in these operations in a particular stage so long as there is a dependency on the previous stage (so that the particular stage does not execute concurrently with the previous stage), and the third-type PHV containers are not used for these match-related operations. The match-related operations include generating hashes with the values in PHV data containers for exact-match addresses, selector tables, hash-addressed stateful tables, etc., using the values directly by stateful tables, generating hash digests for hardware learning, passing the values to the action crossbar as action constants, and passing table addresses to later MAU stages.

In terms of generating output, as explained by reference to FIGS. 2 and 3, the output for the first-type PHV containers is generated by the action ALUs, using both input PHV values (from the same group of PHV data containers, in some embodiments) as well as the action constants. The output for the second-type and third-type PHV containers is generated without the action ALUs (i.e., using the operands directly from the operand MUX). The second-type PHV container output can be based on input PHV values or action constants, whereas the third-type PHV container output can only be sourced from the input PHV values. Lastly, as described further below, the first-type and second-type PHV containers are visible to the deparser (i.e., generated by the parser, and received by the deparser), while the third-type PHV containers only exist within the match-action unit.

Figure 5:
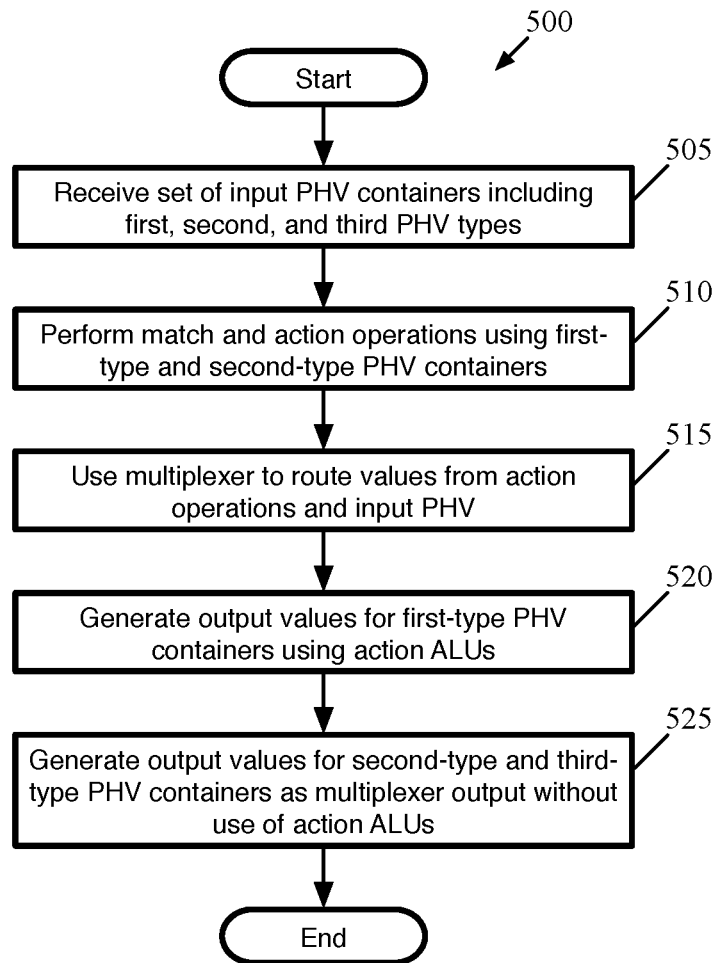
FIG. 5 conceptually illustrates a process 500 of some embodiments for generating PHV output values.

FIG. 5 conceptually illustrates a process 500 of some embodiments for generating PHV output values. In some embodiments, the process 500 is performed by a match-action stage of a network forwarding IC of some embodiments. This process assumes that the second-type PHV containers are available for match-related operations (i.e., that due to dependencies, the stage is not executing synchronously with the previous stage). In addition, it should be understood that the process 500 is conceptual, and represents operations performed by various components within the match-action stage. In some embodiments, some of the operations are performed as a linear process, while some operations are performed synchronously with other operations of the process.

As shown, the process 500 begins by receiving (at 505) a set of input PHV containers including three types of container (i.e., the three types of containers described in FIG. 4 above). In some embodiments, the first-type and second-type containers are received by numerous match-related components of the stage (e.g., the match tables, DSPU, stateful tables, and operand MUX), while the third-type containers are only directed to the operand MUXes.

The process 500 then performs (at 510) match and action operations using the first-type and second-type PHV data containers. These operations, performed by, e.g., the match-tables (and associated components, such as hash generators), DSPU, stateful tables, action instruction memory, and action parameter memory, include generating hashes with the values in PHV data containers for exact-match addresses, selector tables, hash-addressed stateful tables, etc., using the values directly by stateful tables, generating hash digests for hardware learning, and passing the values to the action crossbar as action constants, and passing table addresses to later MAU stages.

Next, the process 500 uses (at 515) the operand multiplexer(s) to route the values from the various action operations and input PHV to the appropriate action ALUs (or to the output PHV containers). The process generates (at 520)

the output values for the first-type PHV data containers using the action ALUs, based on the operands received from the multiplexer(s). In addition, the process generates (at 525) the output values for the second-type and third-type PHV containers as the operand multiplexer output without the use of the action ALUs. As described above, the operand MUX of some embodiments outputs two operands to each action ALU which the action ALUs use to generate the output values for the first-type data containers, while additional pairs of operands are used directly as the second-type and third-type data containers.

The PHV, as noted above, is used to not only carry packet header field values between match-action stages (and allow the stages to modify these values), but also to carry metadata (e.g., the ingress port at which a packet is received, the egress port out of which a packet should be sent, multicast group identifiers, etc.) as well as instructions for subsequent stages, memory addresses for table lookups in subsequent stages, control/data flow required for MAU processing, etc. As the number of match-action stages on the network forwarding IC is limited in some embodiments (for both packet latency and physical area reasons), configuring the match-action unit to perform all desired packet-processing operations may be difficult. The expansion of packet headers (e.g., due to larger encapsulation lengths) only adds to this difficulty.

Figure 6:
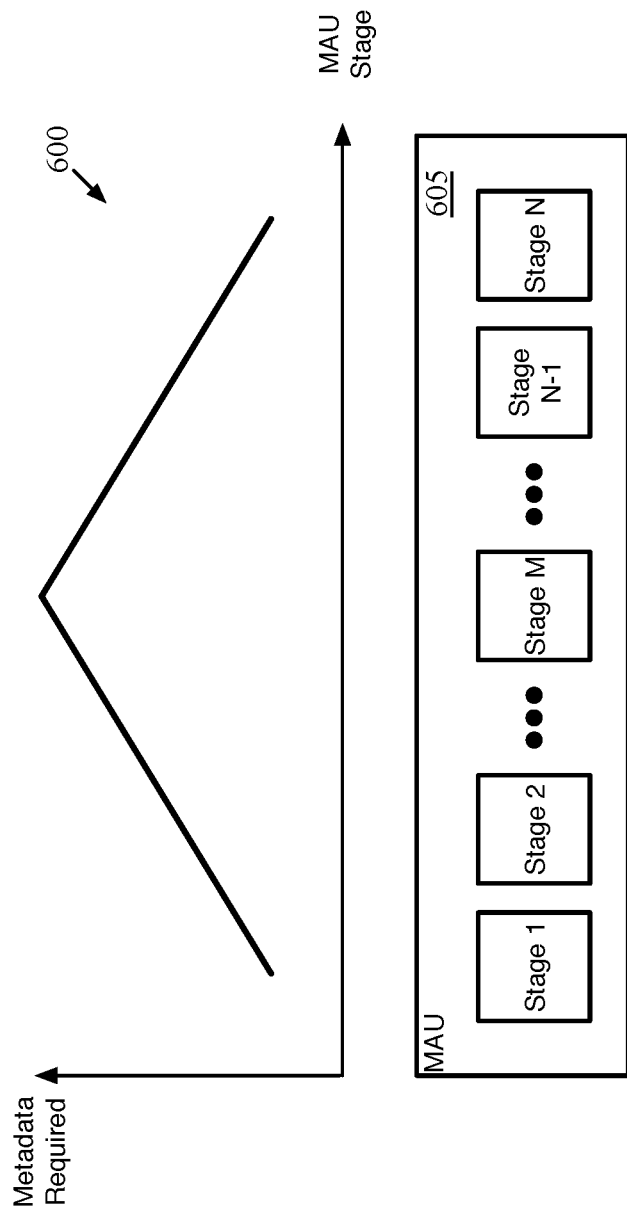
FIG. 6 conceptually illustrates the idea of "metadata bloat" via a graph.

FIG. 6 conceptually illustrates this idea of "metadata bloat" via a graph 600. This graph illustrates the relative amount of metadata required for the PHV to carry (where metadata here also includes instructions, memory addresses, etc.) as a function of the MAU stage. It should be understood that this is a conceptual graph and represents a typical packet, rather than any specific measurements or exact amounts of metadata.

As shown, the match-action unit 605 includes N stages. The amount of metadata required to be carried by the PHV starts out low at the initial stage (because the only metadata will have come from the parser, such as ingress port, etc.). This increases to the middle stage M (if there are an even number of stages, the peak may be at the output of stage N/2), although in different configurations the amount of metadata required may peak before or after the exact middle of the match-action stage sequence. Around the middle of the sequence of match-action stages, the PHV will be carrying the most instructions/addresses/etc., as the earlier stages generate this metadata for use by the later stages. In the later stages, these instructions have been carried out, so the amount of metadata required decreases. By stage N, the metadata required is generally limited to instructions for the deparser (e.g., the list of protocols that make up the packet header) or traffic manager (e.g., a multicast group identifier, an egress queue, etc.).

The use of the multiple types of data containers enables the expansion of the size of the PHV within the match-action unit in some embodiments, without a corresponding expansion in either (i) the size of the PHV output by the parser or provided to the deparser or (ii) the number of wires required to transfer the PHV data from stage to stage. The parser outputs a first number of PHV data containers (including first-type and second-type containers), and then the first match-action stage expands the PHV to a second (larger) number of PHV data containers (adding the third-type containers). Each of the intermediate stages of the match-action unit receives the expanded PHV, potentially modifies the values of the PHV, and passes the expanded PHV to the next stage. At the last stage, the PHV is reduced back to the first number of data containers (including first-type and second-type containers), and provided to the deparser.

Figure 7:
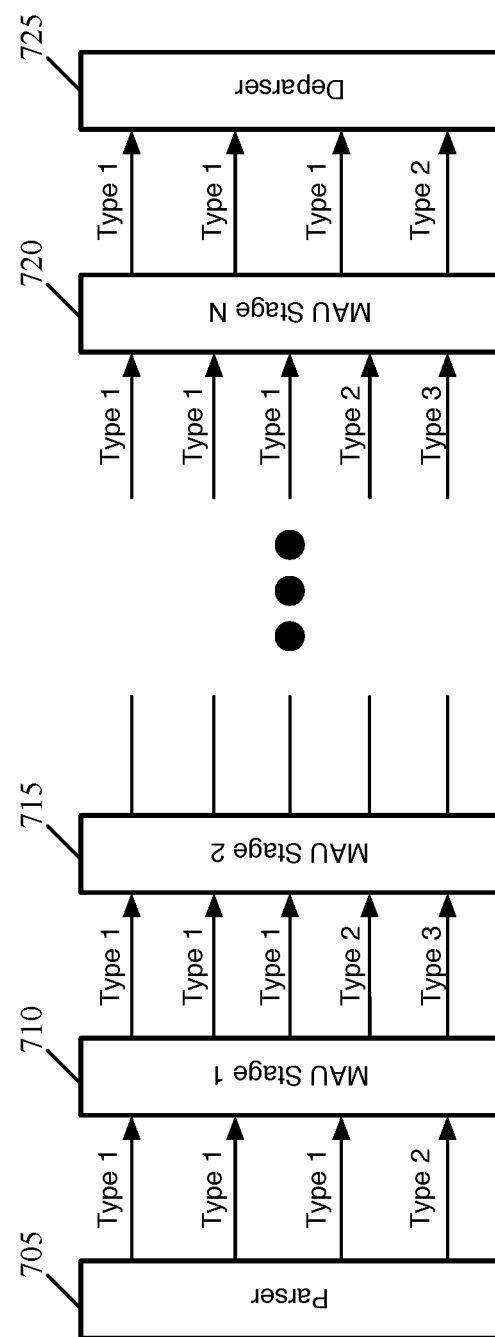
FIG. 7 conceptually illustrates the expansion of the PHV within the MAU.

FIG. 7 conceptually illustrates the expansion of the PHV within the MAU. Specifically, FIG. 7 conceptually illustrates the types of PHV data containers and relative numbers of each type of container sent from the parser 705 to the first MAU stage 710, between subsequent MAU stages, and from the last MAU stage 720 to the deparser 725.

As shown, the parser 705 outputs the PHV for a packet (or for one ingress and one egress packet) to the first MAU stage 710. This includes three arrows representing first-type PHV data containers and one arrow representing second-type PHV data containers. From the parser perspective, all of these data containers are of the same type, with the configuration specifying which packet data to store in which data containers. In some embodiments, the PHV as output by the parser includes specific groups (e.g., groups of four PHVs containers, with every fourth group being a second-type PHV data container. Each such group may be assigned to the ingress packet or egress packet, in some embodiments. As one example, a PHV could have 224 data containers, including sixty-four 32-bit containers, (sixteen of which are second-type containers), sixty-four 8-bit containers (sixteen of which are second-type containers), and ninety-six 16-bit containers (twenty-four of which are second-type containers). Other embodiments may use different numbers and/or different sizes of PHV containers.

The first MAU stage 710 receives the PHV from the parser 705, and outputs to the second stage 715 an expanded PHV. As shown, this includes three arrows representing first-type PHV data containers, one arrow representing second-type PHV data containers, and one arrow representing third-type PHV data containers. Essentially, for each second-type container received from the parser 705, the first MAU stage 710 outputs both a second-type container and a third-type container. In some embodiments, within the MAU, the PHV from the parser is divided into groups that each have sixteen containers (in the 224-container example above, this would include four 8-bit groups, four 32-bit groups, and six 16-bit groups), with twelve first-type and four second-type containers per group. The expanded PHV in this example has twenty containers per group, with twelve first-type, four second-type, and four third-type containers per group (for a total of 280 total data containers). Through the operand MUXes and action ALUs, data can be copied from one container in a group to another container in a group at an MAU stage.

Each of the subsequent intermediate MAU stages receives the expanded PHV from the previous stages and outputs this expanded PHV (typically modified in some way) to the next stage. The final MAU stage 720, however, receives the expanded PHV and outputs a reduced PHV to the deparser 725 having the same number of data containers as those output by the parser 705. As shown, this reduced PHV is shown by three arrows representing first-type containers and one arrow representing second-type data containers. In the example above, this would again be 224 total data containers provided to the deparser 725, the same as were output by the parser. In some embodiments, the final stage 720 outputs all of the data containers as first-type containers, in that the action ALUs are used to generate all of the outputs at this stage. Irrespective of whether the data containers are output as first-type or second-type containers, in some embodiments these are equivalent from the perspective of the parser and deparser.

As mentioned, although the size of the PHV is expanded within the MAU, the use of these different types of containers avoids expanding the number of wires required to transfer the PHV data from stage to stage. In some embodiments, each match-action on the network forwarding IC has a given number of wires passing over the stage, with the first set of wires for carrying the input PHV bits and a second set of wires for carrying the output PHV bits. This enables the PHV to be forwarded to the next stage before processing when that next stage is not dependent on the current stage outputs. In addition, the second-type and/or third-type data container bits use some of the input wires as output wires (with fewer input wires needed due to the restrictions on the second-type and third-type data containers).

This expansion of the PHV data enables a compiler to make optimal use of the different types of PHV data containers for different applications. In some embodiments, the MAU stages are configured by a controller according to a compiled program (or multiple compiled programs, such as an ingress program and an egress program). The compiler receives a program or set of programs (e.g., P4 programs) and assigns different parameters to the various PHV data containers available for each stage. In a typical program, not all of the parameters are needed for matching at each stage, and similarly not all of the parameters need to be used as operands for the ALUs at each stage. The program requirements determine the specific types of data containers required at each stage for each program, and the expansion of the number of PHV data containers enables the compiler to accommodate a larger number of parameters without a significant hardware expansion.

As noted above, the multiplexer that generates the operands for the ALUs as well as the outputs for the second-type and third-type data containers enables MAU stages to copy data values between the different types of data containers (within a group of data containers, in some embodiments). Thus, while the values stored in the third-type data containers are not available for matching in a particular stage, these values can be moved to a different type of data container for use in match and/or action operations at a later stage. In some embodiments, a compiler determines the configuration data that indicates to which PHV data container each header field or piece of metadata is written at each match-action stage, in order for the packet-processing pipeline to execute a specific packet-processing program provided to the compiler. The compiler thus ensures that, when needed for match operations, specific packet header field or metadata values are stored in a PHV data container that is accessible for the match operations.

Figure 8:
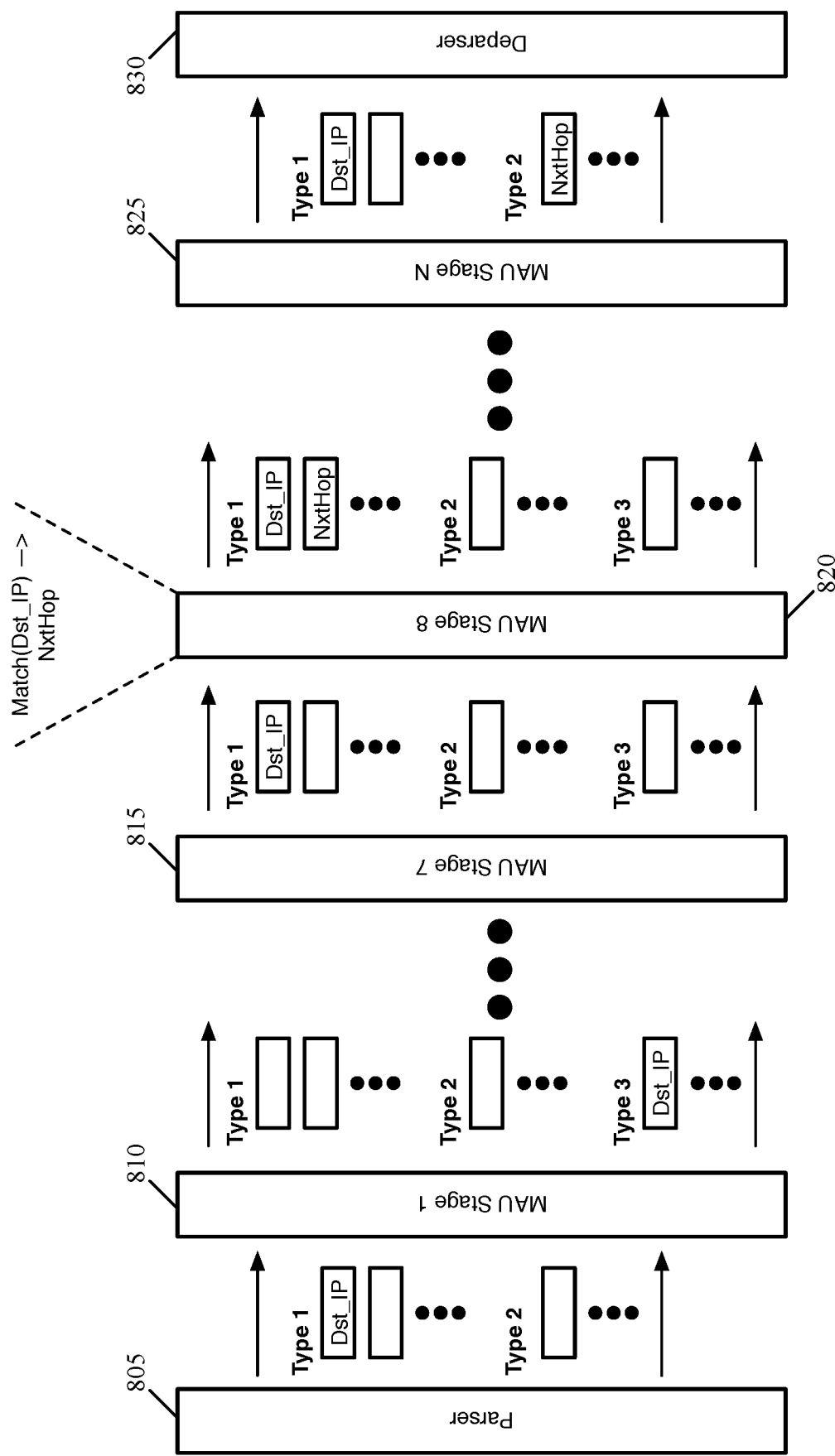
FIG. 8 conceptually illustrates an example of the movement of a packet header field value between different data containers over the course of a packet processing pipeline.

FIG. 8 conceptually illustrates an example of the movement of a packet header field value (specifically, the destination IP address of a packet) between different data containers over the course of a packet processing pipeline 800. As shown, the parser 805 outputs a PHV for a received packet including first-type and second-type containers, with the destination IP address of the received packet stored in one of the first-type containers.

The destination IP address is not needed by the first several stages, and thus the first MAU stage 810 moves this data into a third-type data container (which is not accessible for match-operations), thereby freeing up the first-type and second-type containers for data that is required at earlier stages (e.g., other packet header fields for match operations, instructions for earlier stages, etc.). The seventh match-action stage 815 in the pipeline 800, however, moves the destination IP address value back to a first-type PHV data container, so that the eighth match-action stage 820 can use this value in a match operation. Specifically, the eighth stage 820 performs a routing operation using the match tables, matching on the destination IP address. This generates a next hop address, which is read from, e.g., the action parameter memory and written to another PHV data container (a first-type container). Finally, in the last match-action stage 825, the next hop address is moved to a second-type PHV data container, and the first-type and second-type data containers are provided to the deparser 830.

Figure 9:
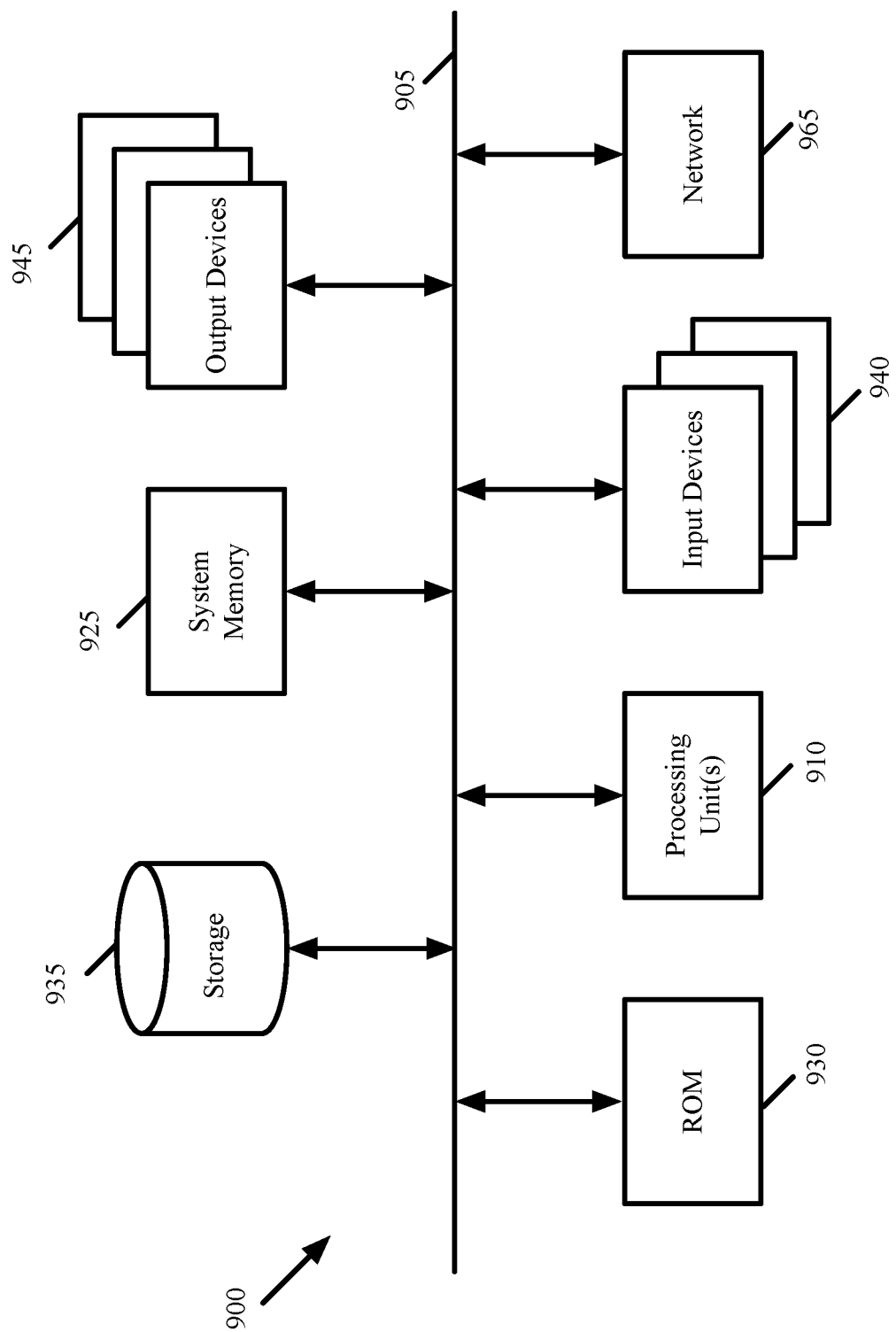
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A network forwarding element comprising:
   a set of packet processing pipelines, wherein at least one of the packet processing pipelines comprises a set of processors and wherein a first packet processing pipeline is to:
   generate a first type of data container and a second type of data container based on a received packet and
   process content of the first type of data container and to process content of the second type of data container, wherein the first and second types of data containers are two different sizes.

2. The network forwarding element of claim 1, wherein a particular type of data container is to convey a particular type of content and the content comprises one or more of: packet data or destination IP address.

3. The network forwarding element of claim 1, wherein:
   the first packet processing pipeline is to output at least one data container and
   the at least one data container comprises a third type of data container or the first or second types of data containers.

4. The network forwarding element of claim 3, wherein a particular type of data container is to convey a particular type of content and wherein the first type and second types of data containers are to convey content that is to be processed by a next match action unit (MAU) stage and the third type of data container is to convey content that is not to be processed by the next MAU stage.

5. The network forwarding element of claim 4, wherein the content comprises one or more of: packet data, destination IP address, memory addresses, instructions, list of protocols that make up a packet header, next hop information, multicast group identifier, or an egress queue identifier.

6. The network forwarding element of claim 1, wherein the first packet processing pipeline comprises a parser, at least one match-action unit, and a deparser.

7. The network forwarding element of claim 6, wherein a match-action unit is to copy data values received from the first type of data container and output the data in another type of data container.

8. The network forwarding element of claim 6, wherein to process the first and second types of data containers, a match-action unit is to generate hashes for matching against match table entries and attempt to match against match table entries.

9. The network forwarding element of claim 6, wherein a match-action unit comprises at least one data-plane stateful processing unit (DSPU) and stateful table.

10. The network forwarding element of claim 6, wherein the deparser is to reconstruct the received packet based on contents of a data container provided by a match-action unit and wherein the network forwarding element is to transmit the reconstructed packet.

11. The network forwarding element of claim 1, wherein operations of the at least one of the packet processing pipelines are programmed by a control plane.

12. A method of processing received packets, the method comprising:
   in a packet processing pipeline, wherein the packet processing pipeline comprises a set of processors:
   generating a first type of data container and a second type of data container based on a received packet and
   processing the first type of data container and processing the second type of data container, wherein the first and second types of data containers are two different sizes.

13. The method of claim 12, wherein a particular type of data container is to convey a particular type of content and the content comprises one or more of: packet data or destination IP address.

14. The method of claim 12, comprising:
generating a third type of data container based on the received packet, wherein the first type and second type of data containers are to convey content that is to be processed by a next match action unit (MAU) stage and the third type of data container is to convey content that is not to be processed by the next MAU stage.

15. The method of claim 14, wherein the content comprises one or more of: packet data, destination IP address, memory addresses, instructions, list of protocols that make up a packet header, next hop information, multicast group identifier, or an egress queue identifier.

16. The method of claim 12, wherein the packet processing pipeline comprises a parser, at least one match-action unit, and a deparser.

17. The method of claim 16, wherein a match-action unit comprises at least one data-plane stateful processing unit (DSPU) and stateful table.

18. The method of claim 12, comprising:
in the packet processing pipeline, copying data values received from the first type of data container and outputting the data in another type of data container.

19. The method of claim 12, wherein processing the first and second types of data containers comprises generating hashes for matching against match table entries and attempting to match against match table entries.

20. The method of claim 12, comprising:
receiving programming of the packet processing pipeline from a control plane.

21. The method of claim 12, comprising:
reconstructing the received packet based on contents of a data container provided by a match-action unit and transmitting the reconstructed packet.

* * * * *